(12) United States Patent
Kort

(10) Patent No.: US 9,179,662 B1
(45) Date of Patent: Nov. 10, 2015

(54) FLY TRAP AND METHOD OF USE

(71) Applicant: Andrew Kort, Long Beach, CA (US)

(72) Inventor: Andrew Kort, Long Beach, CA (US)

( * ) Notice: Subject to any disclaimer, the term of this patent is extended or adjusted under 35 U.S.C. 154(b) by 69 days.

(21) Appl. No.: 14/187,688

(22) Filed: Feb. 24, 2014

Related U.S. Application Data

(63) Continuation-in-part of application No. 13/270,093, filed on Oct. 10, 2011, now abandoned.

(51) Int. Cl.
- *A01M 1/02* (2006.01)
- *A01M 1/10* (2006.01)
- *A01M 1/14* (2006.01)
- *A01M 1/16* (2006.01)

(52) U.S. Cl.
CPC . *A01M 1/16* (2013.01); *A01M 1/02* (2013.01); *A01M 1/10* (2013.01); *A01M 1/106* (2013.01); *A01M 1/14* (2013.01)

(58) Field of Classification Search
CPC ........... A01M 1/16; A01M 1/14; A01M 1/10; A01M 1/00; A01M 1/02; A01M 1/103; A01M 1/106
USPC ..................... 43/115, 114, 107, 122, 121, 113
See application file for complete search history.

(56) References Cited

U.S. PATENT DOCUMENTS

| | | | | |
|---|---|---|---|---|
| 25,997 | A * | 11/1859 | Elwell | 43/107 |
| 96,050 | A * | 10/1869 | Staudinger | 43/107 |
| 161,814 | A * | 4/1875 | Nelson | 43/107 |
| 734,636 | A * | 7/1903 | Truslow | 43/115 |
| 1,080,382 | A * | 12/1913 | Smith | 43/115 |
| 1,131,120 | A * | 3/1915 | Crawford | 43/122 |
| 1,192,334 | A * | 7/1916 | Martin | 43/121 |
| 1,385,207 | A * | 7/1921 | Gardon | A01M 1/2005 43/107 |
| 1,562,586 | A * | 11/1925 | Pool | 43/113 |
| 1,623,439 | A * | 4/1927 | Rawlings | 43/121 |
| 1,655,128 | A * | 1/1928 | Berghorn | 43/114 |
| 1,667,048 | A * | 4/1928 | Rawlings | 43/121 |
| 1,882,380 | A * | 10/1932 | Braun | 43/107 |
| 1,919,916 | A * | 7/1933 | Taylor | 43/107 |
| 2,046,430 | A * | 7/1936 | Rutherford | 43/115 |
| 2,193,492 | A * | 3/1940 | Richardson | 43/107 |

(Continued)

FOREIGN PATENT DOCUMENTS

| | | | | |
|---|---|---|---|---|
| DE | 3316045 | A1 * | 11/1984 | A01M 1/14 |
| EP | 1900280 | A1 * | 3/2008 | A01M 1/10 |

(Continued)

OTHER PUBLICATIONS www.biconet.com/traps/KitchenFruitFlyTrap; Author: Unknown; Date: Unknown.

(Continued)

*Primary Examiner* — Darren W Ark

(74) *Attorney, Agent, or Firm* — Eric Karich; Karich & Associates

(57) ABSTRACT

A method for catching flies comprising the steps of providing a fly trap that includes a fruit bowl having an inner surface and an outer surface, a fly paper holding chamber beneath the fruit bowl shaped to hold fly paper, and a plurality of apertures through the fruit bowl and in communication with the fly paper holding chamber. Fly paper is inserted into the fly paper holding chamber, and fruit is positioned in the fruit bowl, such that flies attracted to the fruit in the fruit bowl may move through the apertures to the fly paper holding chamber, where they are trapped by the fly paper.

5 Claims, 3 Drawing Sheets

(56) References Cited

U.S. PATENT DOCUMENTS

| | | | | |
|---|---|---|---|---|
| 2,435,317 A | * | 2/1948 | McGrew | 43/121 |
| 2,784,520 A | * | 3/1957 | Johnson | 43/115 |
| 2,962,836 A | * | 12/1960 | Hughes | 43/114 |
| 2,997,806 A | * | 8/1961 | Duvall | 43/121 |
| 3,851,417 A | * | 12/1974 | Wunsche | 43/121 |
| 4,030,233 A | * | 6/1977 | Wunsche | 43/121 |
| 4,160,335 A | * | 7/1979 | Von Kohorn et al. | 43/131 |
| 4,208,828 A | * | 6/1980 | Hall | A01M 1/02 43/114 |
| 4,244,135 A | * | 1/1981 | Harwoods | 43/122 |
| 4,263,740 A | * | 4/1981 | Hemsarth et al. | 43/114 |
| 4,283,878 A | * | 8/1981 | Hill et al. | 43/114 |
| 4,316,344 A | * | 2/1982 | Carlsen | 43/114 |
| 4,360,987 A | * | 11/1982 | Lowder | 43/122 |
| 4,505,065 A | * | 3/1985 | Niemeyer | 43/122 |
| 4,577,434 A | | 3/1986 | Davis | |
| 4,608,774 A | * | 9/1986 | Sherman | 43/114 |
| 4,654,998 A | * | 4/1987 | Clay | 43/115 |
| 4,666,767 A | * | 5/1987 | Von Kohorn et al. | 43/132.1 |
| 4,709,503 A | * | 12/1987 | McQueen | 43/114 |
| 4,802,302 A | * | 2/1989 | Alnafissa | 43/114 |
| 4,815,231 A | * | 3/1989 | McQueen | A01M 1/14 43/114 |
| 4,819,370 A | * | 4/1989 | Woodruff | 43/113 |
| 5,253,450 A | * | 10/1993 | Muramatsu | 43/122 |
| 5,274,949 A | * | 1/1994 | Beaton | 43/122 |
| 5,311,697 A | * | 5/1994 | Cavanaugh et al. | 43/114 |
| 5,323,556 A | * | 6/1994 | Carle | 43/113 |
| 5,513,465 A | * | 5/1996 | Demarest et al. | 43/114 |
| 5,588,250 A | * | 12/1996 | Chiba et al. | 43/115 |
| 5,722,199 A | * | 3/1998 | Demarest et al. | 43/114 |
| 5,842,305 A | * | 12/1998 | Liao | 43/122 |
| 6,041,543 A | * | 3/2000 | Howse | 43/121 |
| 6,134,826 A | * | 10/2000 | Mah | 43/113 |
| 6,216,383 B1 | * | 4/2001 | Klabunde et al. | 43/121 |
| 6,266,917 B1 | * | 7/2001 | Hight | A01M 1/103 43/114 |
| 6,327,810 B1 | * | 12/2001 | Howse | 43/114 |
| 6,574,914 B2 | * | 6/2003 | Smith | 43/114 |
| 6,625,922 B1 | * | 9/2003 | Ernsberger, IV | 43/122 |
| 6,871,443 B2 | * | 3/2005 | Lambert et al. | 43/114 |
| 6,925,749 B2 | * | 8/2005 | Wong | 43/122 |
| 7,694,456 B1 | * | 4/2010 | Curtis | 43/122 |
| 8,028,467 B2 | * | 10/2011 | Bagnall et al. | 43/122 |
| 8,104,223 B1 | * | 1/2012 | Rodriguez | 43/115 |
| 8,341,874 B2 | * | 1/2013 | Studer et al. | 43/115 |
| 2001/0042337 A1 | * | 11/2001 | Lambert et al. | 43/114 |
| 2004/0068917 A1 | * | 4/2004 | Chan | 43/113 |
| 2005/0005503 A1 | * | 1/2005 | Bragg | 43/115 |
| 2006/0207163 A1 | * | 9/2006 | Frokopy | 43/131 |
| 2006/0236592 A1 | * | 10/2006 | Hall | 43/122 |
| 2007/0124987 A1 | * | 6/2007 | Brown et al. | 43/114 |
| 2008/0022583 A1 | * | 1/2008 | Kurashima et al. | 43/121 |
| 2008/0196296 A1 | * | 8/2008 | Studer et al. | 43/114 |
| 2009/0183419 A1 | * | 7/2009 | Harris | 43/114 |
| 2011/0072710 A1 | * | 3/2011 | Kuus | 43/107 |
| 2011/0099885 A1 | * | 5/2011 | Maganga | 43/122 |
| 2012/0266519 A1 | * | 10/2012 | Wright | 43/113 |
| 2012/0311919 A1 | * | 12/2012 | Hardigree | 43/107 |
| 2015/0068104 A1 | * | 3/2015 | Mason | 43/107 |

FOREIGN PATENT DOCUMENTS

| | | | | |
|---|---|---|---|---|
| JP | 10113112 A | * | 5/1998 | A01M 1/14 |
| JP | 2001211805 A | * | 8/2001 | A01M 1/14 |
| JP | 2002125563 A | * | 5/2002 | A01M 1/02 |
| JP | 2002142643 A | * | 5/2002 | A01M 1/14 |
| JP | 2002153192 A | * | 5/2002 | A01M 1/10 |
| JP | 2002233286 A | * | 8/2002 | A01M 1/14 |
| JP | 2002272344 A | * | 9/2002 | A01M 1/10 |
| JP | 2002291391 A | * | 10/2002 | A01M 1/10 |
| JP | 2003153645 A | * | 5/2003 | A01M 1/14 |
| JP | 2005073647 A | * | 3/2005 | A01M 1/14 |
| JP | 2005160458 A | * | 6/2005 | A01M 1/10 |
| JP | 2006180805 A | * | 7/2006 | A01M 1/14 |
| JP | 2008061561 A | * | 3/2008 | A01M 1/14 |
| JP | 2008099598 A | * | 5/2008 | A01M 1/14 |
| JP | 2010130947 A | * | 6/2010 | A01M 1/14 |
| JP | 2010142207 A | * | 7/2010 | A01M 1/14 |
| WO | WO 9718704 A1 | * | 5/1997 | A01M 1/14 |
| WO | WO 9959403 A1 | * | 11/1999 | A01M 1/10 |
| WO | WO 2004091292 A1 | * | 10/2004 | A01M 1/10 |
| WO | WO 2009099278 A2 | * | 8/2009 | A01M 1/14 |

OTHER PUBLICATIONS www.springstar.net/kitchenfruitflytrap; Author: Unknown; Date: Unknown.

www.gardnerep.com/trapple.html; Author: Unknown; Date: Unknown.

www.domyownpestcontrol.com/vector-960-fruit-fly-trap-p-1296; Author: Unknown; Date: Unknown.

* cited by examiner

FLY TRAP AND METHOD OF USE

CROSS-REFERENCE TO RELATED APPLICATIONS

This application for a utility patent is a continuation-in-part of a previously filed utility patent, still pending, having the application Ser. No. 13/270,093, filed Oct. 10, 2011.

STATEMENT REGARDING FEDERALLY SPONSORED RESEARCH

Not Applicable

BACKGROUND OF THE INVENTION

1. Field of the Invention

This invention relates generally to fly traps, and more particularly to a fruit bowl that is adapted for trapping flies.

2. Description of Related Art

The prior art teaches a wide variety of fly traps, many of which rely on fly paper to capture the flies. An example of such a device is shown in Davis, U.S. Pat. No. 4,577,434, which teaches a trap that includes a strip of flypaper that is enclosed within a protective enclosure. The enclosure includes apertures that enable flies to enter the enclosure, where they are trapped by the flypaper.

In some embodiments, the traps have been adapted to be placed in a kitchen and near fruits and the like. A kitchen trap, sold under the name BIOCARE, is advertised as being safe for use around food in a kitchen. In another example, the trap is shaped to resemble a piece of fruit, such as an apple-shaped trap that is commonly sold under the name TRAPPLE.

Hill et al., U.S. Pat. No. 4,283,878, teaches an insect trap that includes a chimney-type structure that holds a reservoir of an artificial attractant that is released out of a hole in the top of the chimney, to attract flies into the chimney so that they can be captured by an adhesive on the sides of the chimney. While there is a structure at the top of the chimney that is arguable similar to a bowl, there is no teaching to actually use this structure as a bowl for holding fruit, and the chimney-type structure is not particularly well suited for this task. The chimney structure would not fit well in a typical kitchen, and a hole at the top is large enough to allow fruit to fall into the chimney-type structure and into the reservoir of attractant.

Curtis, U.S. Pat. No. 7,694,456, teaches a bowl of an attractant that is adapted to be placed adjacent a bowl of fruit for attracting flies away from the fruit and into the trap. Both Curtis and Hill teach away from the present invention, which uses the fruit itself to attract flies into the trap that is integral with the fruit bowl.

The prior art teaches various forms of traps that include flypaper for trapping flies, and the prior art also teaches placing the trap in the kitchen near fruit. However, the prior art does not teach the placement of fruit in an integral bowl structure of the trap, as the prior art devices are specifically designed to only be traps and not to hold fruit intended for human consumption. The present invention fulfills these needs and provides further related advantages as described in the following summary.

SUMMARY OF THE INVENTION

The present invention teaches certain benefits in construction and use which give rise to the objectives described below.

The present invention provides a method for catching flies using a fly trap that includes a fruit bowl having an inner surface and an outer surface, a fly paper holding chamber integrally constructed beneath the fruit bowl shaped to hold fly paper, and a plurality of apertures through the fruit bowl and into the fly paper holding chamber. Fly paper is inserted into the fly paper holding chamber, and fruit is positioned in the fruit bowl, such that flies attracted to the fruit in the fruit bowl may move through the apertures to the fly paper holding chamber, where they are trapped by the fly paper.

A primary objective of the present invention is to provide a method for catching flies having advantages not taught by the prior art.

Another objective is to provide a method for catching flies that utilizes fruit in a fruit bowl as a natural attractant to capture the flies, and thus keep the flies off the fruit, and also remove the requirement of a secondary artificial attractant.

Another objective is to provide a method for catching flies that keeps flies away from fruit that is left out for people to eat, without interfering with the persons eating the fruit.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
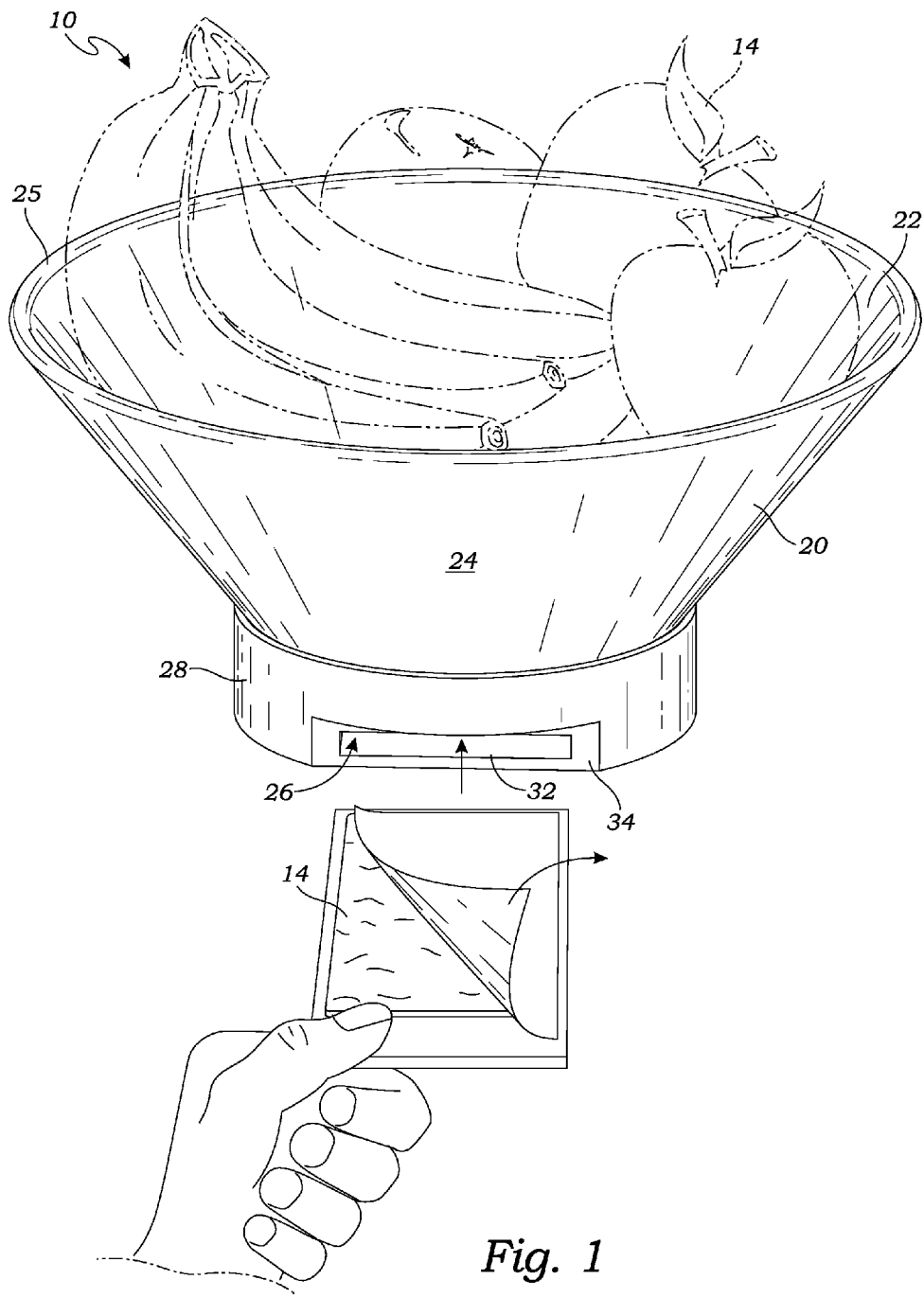
FIG. 1 is a perspective view of a fly trap according to one embodiment of the present invention.

The above-described drawing figures illustrate the invention, a fly trap 10 that is shaped to form a fruit bowl 20 for holding fruit 12, and also includes a base 28 that defines a fly paper holding chamber 26 for holding fly paper 14.

Figure 2:
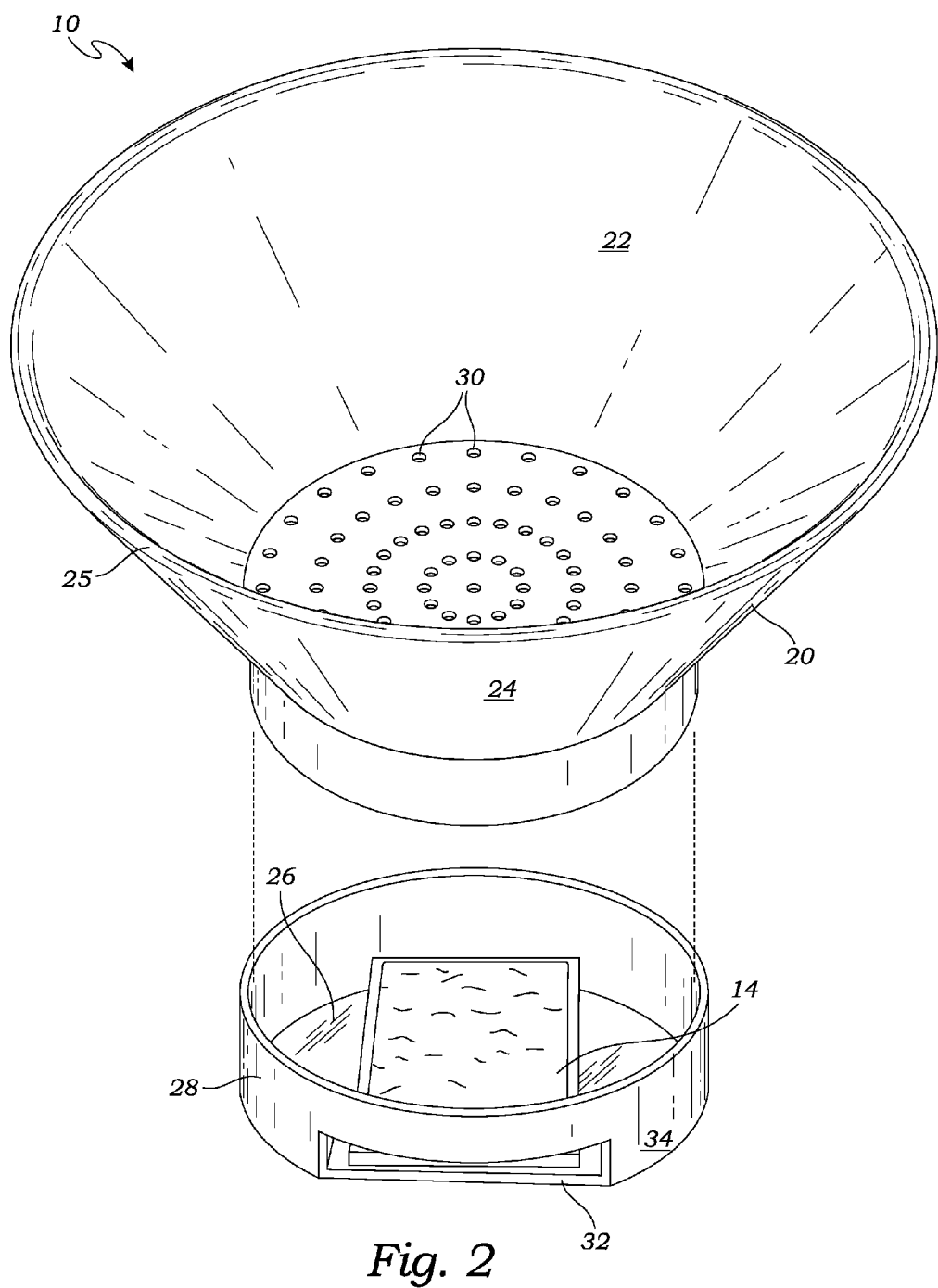
FIG. 2 is an exploded perspective view thereof.

FIG. 1 is a perspective view of the fly trap 10 according to one embodiment of the present invention. FIG. 2 is an exploded perspective view thereof. As illustrated in FIGS. 1 and 2, the fruit bowl 20 has an inner surface 22 and an outer surface 24 that extend to a perimeter 25 to form a bowl. The inner surface 22 is shaped to hold the fruit 12, typically a concave bowl shaped surface, although many alternative shapes may be used for meeting both functional and decorative requirements. For purposes of this application, any form of structure and shape that is acceptable for use as a fruit bowl in a kitchen is included within the scope of this terminology.

The base 28 defines the fly paper holding chamber 26 is positioned beneath or adjacent the fruit bowl 20 and shaped to hold the fly paper 14. The specific location of the fly paper holding chamber 26 may vary; however, in the present embodiment, the fly paper holding chamber 26 is integrally constructed with the fruit bowl 20 and supports the fruit bowl 20. In alternative embodiments, the fly paper holding chamber 26 might be positioned in various forms of chambers, or different embodiments of a base. The fly paper holding chamber 26 may include different sizes and shapes, as long as it is able to receive fly paper 14, as discussed below. The term chamber is hereby defined to include one or more chambers, slots, hollows, compartments, voids, attachment points, receivers, cavities, or other forms of suitable structure for receiving the fly paper 14 in a suitable manner.

As illustrated in FIG. 2, a plurality of apertures 30 extend through the fruit bowl 20 such that they are in fluid communication with the fly paper holding chamber 26. The apertures 30 are sized and shaped to enable flies that have been attracted to the fruit 12 in the fruit bowl 20 to move through the apertures 30 into the fly paper holding chamber 26, where they can be trapped by the fly paper 14. The apertures 30 are smaller than typical pieces of fruit 12 (e.g., apples, bananas, oranges, and other fruit commonly consumed), preferably less than 1 inch in diameter, most preferably between 0.1-0.5 inches in diameter.

In the embodiment of FIGS. 1-2, the base 28 is generally cylindrical in shape, and is separate from and removably attachable to the fruit bowl 20. In this embodiment, the base 28 is shaped to support the fruit bowl 20 when the fruit bowl 20 is mounted on the base 28. The base 28 may simply frictionally engage the fruit bowl 20, or may engage the fruit bowl 20 (e.g., with a threaded surface, or via another method, or they may be integrally formed.

In this embodiment, the base 28 includes an insertion slot 32 through a sidewall 34 through which the fly paper 14 may be inserted into and removed from the fly paper holding chamber 26. In other embodiments, the base 28 may include other structures that enable the fly paper 14 to be inserted. For example, the bowl 20 may be removable from the base 28 so that once the bowl 20 is lifted off the base 28, the fly paper 14 may be positioned into the chamber 26. Other embodiments are described below.

Figure 3:
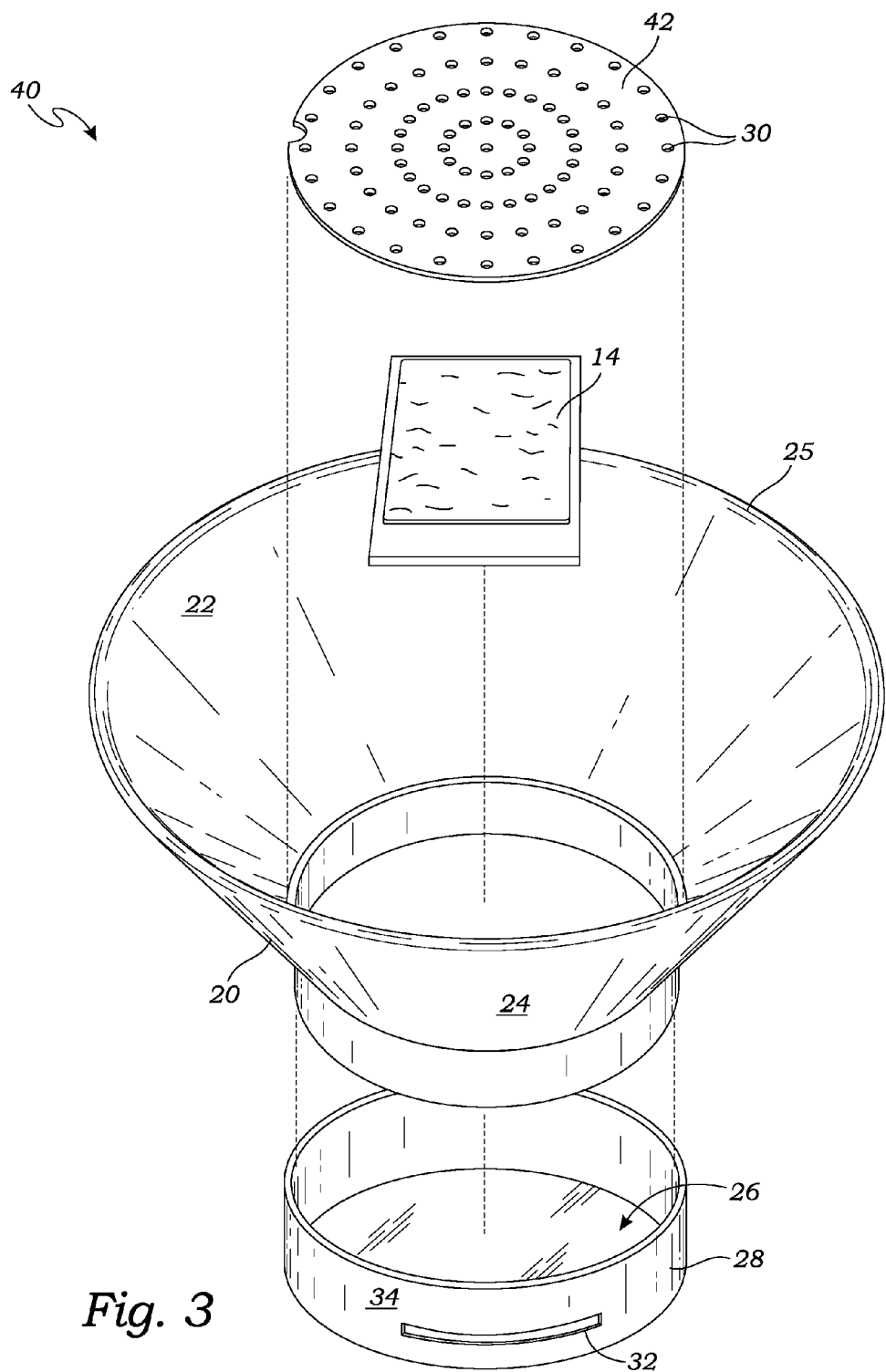
FIG. 3 is an exploded perspective view of another embodiment of the fly trap.

FIG. 3 is an exploded perspective view of another embodiment of the fly trap 40. In this embodiment, the fruit bowl 20 includes a removable plate 42 that forms at least a portion of the inner surface 22 of the fruit bowl 20. The removable plate 42 covers the fly paper holding chamber 26, and the plurality of apertures 30 are formed through the removable plate 42. The removable plate 42 may also engage the fruit bowl 20 (e.g., threaded engagement, snap fit engagement, etc.) if that is desired. While two embodiments are illustrated in FIGS. 1-3, those skilled in the art could develop many alternative constructions consistent with the teachings of this invention, and such alternatives should be considered within the scope of the invention as claimed.

The invention further includes a method for catching flies using the above-described fly trap 10 (or 40, in another embodiment). The method includes the steps of assembling the fly trap 10, and inserting the fly paper 14 into the fly paper holding chamber 26. Once the fly trap 10 is ready, fruit 12 may be placed in the fruit bowl 20, as with any prior art fruit bowl 20. When flies are attracted to the fruit 12 in the fruit bowl 20, they may move through the apertures 30 to the fly paper holding chamber 26, where they are trapped by the fly paper 14. The fly paper 14 may be periodically removed from the fly trap 10 and replaced with fresh fly paper 14.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A method for catching flies, the method comprising the steps of:
   providing a fly trap comprising:
      a fruit bowl having an upper end, a lower end, a concave shaped inner surface and an outer surface, wherein the fruit bowl tapers from the upper end to the lower end;
      a base that defines a fly paper holding chamber beneath the fruit bowl; and
      a plurality of apertures through the fruit bowl to communicate directly with the fly paper holding chamber;
   inserting fly paper into the fly paper holding chamber; and
   positioning fruit in the fruit bowl, such that flies attracted to the fruit in the fruit bowl may move through the apertures into the fly paper holding chamber, where they are trapped by the fly paper.

2. The method of claim 1, wherein the plurality of apertures each have a diameter of less than 1 inch.

3. The method of claim 1, wherein the plurality of apertures are each between 0.1-0.5 inches in diameter.

4. The method of claim 1, wherein the fly paper holding chamber is beneath the fruit bowl and the fruit bowl is supported by the base.

5. A method for catching flies, the method comprising the steps of:
   providing a fly trap comprising:
      a fruit bowl having an upper end, a lower end, a concave shaped inner surface and an outer surface, wherein the fruit bowl tapers from the upper end to the lower end;
      a base that defines a fly paper holding chamber beneath the fruit bowl; and
      a plurality of apertures through the fruit bowl to communicate directly with the fly paper holding chamber, wherein each of the apertures is between 0.1-0.5 inches in diameter;
   inserting fly paper into the fly paper holding chamber; and
   positioning fruit in the fruit bowl, such that flies attracted to the fruit in the fruit bowl may move through the apertures into the fly paper holding chamber, where they are trapped by the fly paper.

* * * * *